US007017143B1

(12) United States Patent
Andrew et al.

(10) Patent No.: US 7,017,143 B1
(45) Date of Patent: Mar. 21, 2006

(54) EXTERNAL RESOURCE FILES FOR APPLICATION DEVELOPMENT AND MANAGEMENT

(75) Inventors: Felix G. T. I. Andrew, Seattle, WA (US); John D. Colleran, Redmond, WA (US); Ian M. Ellison-Taylor, Seattle, WA (US); Mark S. Carroll, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/452,421

(22) Filed: Dec. 1, 1999

(51) Int. Cl.
G06F 9/44 (2006.01)

(52) U.S. Cl. ............... 717/100; 717/101; 717/103; 717/109; 717/110; 709/203; 709/219; 715/713; 715/760

(58) Field of Classification Search ........ 717/100–106, 717/160, 113–114, 108–111, 168; 345/418, 345/594, 650, 676, 741, 760, 740, 544; 709/223, 709/203, 224, 219; 707/104.1, 5; 703/201; 715/513, 760, 771, 713; 716/1
See application file for complete search history.

(56) References Cited

U.S. PATENT DOCUMENTS

| 4,899,136 | A | | 2/1990 | Beard et al. |
| 5,371,675 | A | | 12/1994 | Greif et al. |
| 5,375,241 | A | * | 12/1994 | Walsh ..................... 709/331 |
| 5,499,335 | A | | 3/1996 | Silver et al. |
| 5,546,525 | A | | 8/1996 | Wolf et al. |
| 5,563,997 | A | | 10/1996 | Fisher |
| 5,623,591 | A | | 4/1997 | Cseri |
| 5,651,108 | A | | 7/1997 | Cain et al. |
| 5,694,561 | A | | 12/1997 | Malamud et al. |
| 5,745,712 | A | | 4/1998 | Turpin et al. |
| 5,815,703 | A | | 9/1998 | Copeland et al. |
| 5,838,317 | A | | 11/1998 | Bolnick et al. |
| 5,844,554 | A | | 12/1998 | Geller et al. |
| 5,855,015 | A | * | 12/1998 | Shoham ..................... 707/5 |
| 5,905,492 | A | * | 5/1999 | Straub et al. .............. 345/744 |
| 5,980,090 | A | * | 11/1999 | Royal et al. ............... 700/241 |
| 5,983,245 | A | * | 11/1999 | Newman et al. ........... 715/513 |
| 6,083,276 | A | | 7/2000 | Davidson et al. |
| 6,121,964 | A | | 9/2000 | Andrew |
| 6,125,385 | A | * | 9/2000 | Wies et al. ................ 709/203 |
| 6,252,593 | B1 | | 6/2001 | Gti |
| 6,298,474 | B1 | * | 10/2001 | Blowers et al. ........... 717/104 |

(Continued)

OTHER PUBLICATIONS

Title: An Architecture for WWW-based Hypercode Environments, author: Kaiser et al, ACM, 1997.*

(Continued)

*Primary Examiner*—Chameli C. Das
(74) *Attorney, Agent, or Firm*—Leydig, Voit & Mayer, Ltd

(57) ABSTRACT

This invention provides a method and system for developing a software application program with user interfaces that make resource files external to the other compiled executable files such that the information from the resource file may be obtained at runtime as needed without the need for compilation. The external resource file may be edited at runtime to allow designers to modify the application's interface without having to depend on developers implement changes in the interface. This is achieved by providing resources in a markup language and routines that locate and parse the markup language text on the fly as an application executes. Compartmentalization of the effort in developing and porting an application is facilitated for protection of source code and better management of designers and developers working on different aspects of a software application due to the externalization of the resource files needed primarily by the designers.

29 Claims, 7 Drawing Sheets

U.S. PATENT DOCUMENTS

| | | | |
|---|---|---|---|
| 6,336,214 B1 | 1/2002 | Sundaresan | |
| 6,370,141 B1 * | 4/2002 | Giordano et al. | 370/386 |
| 6,393,569 B1 * | 5/2002 | Orenshteyn | 713/201 |
| 6,415,298 B1 * | 7/2002 | Oesterer et al. | 707/203 |
| 6,446,256 B1 | 9/2002 | Hyman et al. | |
| 6,546,419 B1 * | 4/2003 | Humpleman et al. | 709/223 |
| 6,560,621 B1 * | 5/2003 | Barile | 715/513 |
| 6,603,488 B1 * | 8/2003 | Humpleman et al. | 715/771 |
| 6,615,253 B1 * | 9/2003 | Bowman-Amuah | 709/219 |
| 6,742,165 B1 * | 5/2004 | Lev et al. | 716/1 |
| 6,754,181 B1 * | 6/2004 | Elliott et al. | 370/252 |
| 6,763,386 B1 * | 7/2004 | Davis et al. | 709/224 |
| 6,769,115 B1 * | 7/2004 | Oldman | 717/126 |

OTHER PUBLICATIONS

Title: Web-Based Development and Complex Information Products, author: Fielding et al, ACM, 1998.*

Microsoft Press. *The Windows Interface Guidelines for Software Design.* Redmond, Washington. 1995.

Microsoft Corporation. *Chapter Seven An Introduction to Application Resources.* [web page] 1999. http://msdn.microsoft.com/library/partbook/win98dh/chaptersevenintroductiontoapplicationresources.htm. [Accessed Oct. 18, 1999].

Microsoft Corporation. *Child Window and Dialog Box Procedures.* [web page]. 1999. http://msdn.microsoft.com/library/partbook/win98dh/childwindowdialogboxprocedures.htm. [Accessed Oct. 18, 1999].

Microsoft Corporation. *Adding and Editing Resource Elements.* [web page]. 1999. http://msdn.microsoft.com/library/partbook/win98dh/addingeditingresourceelements.htm. [Accessed Oct. 18, 1999].

Microsoft Corporation. *Viewing and Changing Resource Identifiers.* [web page]. 1999. http://msdn.microsoft.com/library/partbook/win98dh/viewingchangingresourceidentifiers.htm. [Accessed Oct. 18, 1999].

Finocchio, Mark. *Microsoft Developer's Network CD: Control Spy Exposes the Clandestine Life of Windows Common Controls, Part I.* Microsoft Corporation, Jul. 1999.

Finocchio, Mark. *Microsoft Developer's Network CD: Control Spy Exposes the Clandestine Life of Windows Common Controls, Part II.* Microsoft Corporation, Jul. 1999.

Microsoft Corporation. *CreateDialog.* [web page]. 1999. http://msdn.microsoft.com/library/wcedoc/wcesdkr/uif_ac_44.htm. [Accessed Oct. 18, 1999].

Microsoft Corporation. *CreateDialog.* [web page]. Sep. 28, 1999. http://msdn.microsoft.com/library/psdk/winui/dlgboxes_4hwn.htm. [Accessed Oct. 18, 1999].

Microsoft Corporation. *DialogProc.* [web page]. 1999. http://msdn.microsoft.com/library/wcedoc/wcesdkr/kf_de_8.htm. [Accessed Oct. 18, 1999].

Microsoft Corporation. *WM_INITDIALOG.* [web page]. 1999. http://msdn.microsoft.com/library/wcedoc/wcesdkr/uim_uw_65.htm. [Accessed Oct. 18, 1999].

Dr. Gui. Microsoft Corporation. *Dr. GUI Does Data with XML.* [web page]. Oct. 20, 1997. http://msdn.microsoft.com/library/Welcome/dsmsdn/msdn_guixml.htm. [Accessed Oct. 18, 1999].

Dr. Gui. Microsoft Corporation. *Scripting Your Options.* [web page]. Nov. 10, 1997. http://msdn.microsoft.com/library/Welcome/dsmsdn/msdn_guiscript.htm. [Accessed Oct. 18, 1999].

Dr. Gui. Microsoft Corporation. *Should Your Next UI Be Written in Dynamic HTML?.* [web page]. Nov. 3, 1997. http://msdn.microsoft.com/library/Welcome/dsmsdn/msdn_guihtml.htm. [Accessed Apr. 14, 2000].

Microsoft Corporation. *Dynamic Link Libraries.* [web page]. 1999. http://msdn.microsoft.com/library/partbook/win98dh/typesofresources.htm. [Accessed Oct. 18, 1999].

Microsoft Corporation. *Editing Modes.* [web page]. 1999. http://msdn.microsoft.com/library/devprods/vs6/vinterdev/vidref/viconeditingmodes.htm. [Accessed Oct. 18, 1999].

Microsoft Corporation. *Header Files.* [web page]. 1999. http://msdn.microsoft.com/library/partbook/win98dh/headerfiles.htm. [Accessed Oct. 21, 1999].

Microsoft Corporation. *Linking Resources.* [web page]. 1999. http://msdn.microsoft.com/library/partbook/win98dh/linkingresources.htm. [Accessed Oct. 21, 1999].

Microsoft Corporation. *The Message-Handling Structure.* [web page]. 1999. http://msdn.microsoft.com/library/partbook/win98dh/themessagehandlingstructure.htm. [Accessed Oct. 18, 1999].

Microsoft Corporation. *Messages and Event-Driven Programming.* [web page]. 1999. http://msdn.microsoft.com/library/partbook/win98dh/messageseventdrivenprogramming.htm. [Accessed Oct. 18, 1999].

Microsoft Corporation. *Opening Project and Resource Files.* [web page]. 1999. http://msdn.microsoft.com/library/partbook/win98dh/openingprojectresourcefiles.htm. [Accessed Oct. 21, 1999].

Microsoft Corporation. *The Template.RC Script.* [web page]. 1999. http://msdn.microsoft.com/library/partbook/win98dh/thetemplaterscript.htm. [Accessed Oct. 18, 1999].

Microsoft Corporation. *Types of Resources.* [web page]. 1999. http://msdn.microsoft.com/library/partbook/win98dh/typesofresources.htm. [Accessed Oct. 18, 1999].

Microsoft Corporation. *Using a Resource Editor.* [web page]. 1999. http://msdn.microsoft.com/library/partbook/win98/usingresourceeditor.htm. [Accessed Oct. 21, 1999].

Microsoft Corporation. *Files and File Types.* [web page]. 1999. http://msdn.microsoft.com/library/partbook/win98dh/filesfiletypes.htm. [Accessed Oct. 18, 1999].

Microsoft Corporation. *The Windows.H Header File.* [web page]. 1999. http://msdn.microsoft.com/library/partbook/win98dh/thewindowshheaderfile.htm. [Accessed Oct. 18, 1999].

Microsoft Corporation. *The WinMain Procedure.* [web page]. 1999. http://msdn.microsoft.com/library/partbook/win98dh/thewinmainprocedure.htm. [Accessed Oct. 18, 1999].

Microsoft Corporation. *The WndProc Procedure.* [web page]. 1999. http://msdn.microsoft.com/library/partbook/win98dh/thewndprocprocedure.htm. [Accessed Oct. 21, 1999].

Microsoft Corporation. *Message Loop Alternatives.* [web page]. 1999. http://msdn.microsoft.com/library/partbook/win98dh/messageloopalternatives.htm. [Accessed Oct. 18, 1999].

Adobe Systems, Inc., "Adobe® FrameMaker+ SGML", Version 5.5, pp. 1-18 (1997).

Bray et al., "Extensible Markup Language (XML) 1.0," W3C Recommendation, REC-xml-19980210, pp. i-iv, 1-32 (1998).

Goldfarb et al., *The XML Handbook*, Prentice Hall PTR, Upper Saddle River, NJ, pp. 279-384 (1998).

Harold, Elliotte Rusty, *XML™ Bible*, IDG Books Worldwide, Inc., Chapter 1 (1999).

Megginson, David, *Structuring XML Documents*, Prentice Hall PTR, Upper Saddle River, NJ, pp. xxxi-xxxiii, 4-5, 21-23, 28-32, 87, 215-218, 235-242 (1998).

Suzuki et al., "Leveraging Distributed Software Developement," *IEEE Computer*, vol. 32, No. 9, pp. 59-65 (1999).

* cited by examiner

EXTERNAL RESOURCE FILES FOR APPLICATION DEVELOPMENT AND MANAGEMENT

TECHNICAL FIELD

This invention relates generally to development of computer software applications and more particularly to the development of user interfaces in application programs.

BACKGROUND OF THE INVENTION

Creating valuable application programs requires more than just programming ability. There is an increasing appreciation for the need for aesthetics and ease of use in the design of user interfaces. To term the new user interfaces design strategies in cutting edge software as being "ergonomic" is not an overstatement. The rapid rate of obsolescence in software has further increased the pressure to create increasingly sophisticated application programs complete with bug free code and friendly interfaces in a short period of time or risk missing the small window of economic opportunity.

A typical traditional application program has a source code, which is usually organized in several modules. Following compilation, these modules are linked to form an executable program. This simplistic picture is modified significantly in the modem programming paradigm. Thus, in the popular "WINDOWS®" operating system environment found in operating systems manufactured by the "MICROSOFT®" corporation of Redmond, Wash., application development typically requires generation of several different files types that cooperate to give effect to an application. The details of the file types actually used depend on many factors including the actual source code used. Thus, for example, an application written in C++ may have several resource files, with file extension .RC, while in contrast, a program written in Visual Basic can have only one resource file with a different file extension.

A "WINDOWS®" application program typically has an executable file that generally creates, directly or indirectly by making appropriate calls, one or more "WINDOWS®" elements to implement a user interface. Communications between different parts of the application and the operating system use the message facility provided by the operating system. Optionally, function calls can also be made to effect communications. The message facility conveniently allows user input generated events to be handled at different levels while allowing the application to communicate with the "WINDOWS®" elements to format and control their properties.

In addition, unlike earlier programming styles, in a "WINDOWS®" environment, there are files with code modules such as dynamic link library (DLL) files, resource files, library files and other file types that are used to generate an application. A respectable application may depend on thousands of files to handle the different scenarios that may develop in course of its execution. These files are usually compiled individually and linked at various stages in the development and execution of the application. Presently, such files are compiled to generate binaries that are integrated into the application at each stage. The shipped application is an integrated package of a plurality of compiled binary files for installation and execution of the entire package. Of particular interest are the resource files that include information relevant to the design and implementation of the graphical elements shown on the screen.

When an application uses a routine in a "DLL" file, the operating system loads the DLL file into memory, resolves references to functions in the DLL file so that they can be called by the application, and unloads the DLL file when it is no longer needed. This dynamic linking mechanism can be performed explicitly by applications or implicitly by the operating system. The advantage in using several DLL files is that if an error in a file needs to be corrected, the entire code does not need to be recompiled. Instead only the relevant file is corrected and recompiled. Furthermore, the entire executable code does not have to be loaded at runtime as individually compiled DLL files are loaded as needed. DLL files can also be used to allow independent resource files to be created often have their own data address space mapped into the address space of the process.

Although resource files contain data, such as parameters, bitmaps for icons, font and color choices and the like for rendering graphical symbols, they cannot be treated as merely data files that may be accessed at runtime due to their dynamic use in giving effect to the user interface. Some user interface elements, i.e., "WINDOWS®" elements, of interest include dialog boxes, message boxes, drop-down lists, menus, toolbars even audio effects. Each user interface element needs to be invoked at the right time and place with modifications for accomplishing a particular purpose.

Some user interface elements convey information to the user while others also collect information, and all, preferably, add to the experience of the user. The placement and details of the design implementation are preferably controlled by parameters supplied in resource files, which may be edited with the help of programming tools and resource editors, available in some environments, or by directly modifying the application source code. However, such programming tools or resource editors cannot be used to change the appearance of an application while it is executing. Moreover, use of the programming tools and editors requires considerable training and technical knowledge since, potentially, rest of the application source code could be corrupted by what may appear to be minor errors to the uninitiated.

This, in turn, has resulted in focusing attention on the process of designing and developing application programs. As may be expected, cost is an important consideration in the development of improved computer programs. Programmers skilled in writing code for applications are expensive, and programmers having an additional feel for the aesthetic needs of the ordinary consumer are even more precious. Consequently, in developing an application a division of labor between the "designers" and the "developers" has proven to be cost effective. Developers specialize in coding, debugging and similar programming related tasks while "designers" are so designated due to their skill in designing the look and feel of an application. Many designers lack the coding prowess of the average developer and conversely, many developers lack the presentation skills that a designer brings to the job.

A common difficulty in managing such a diverse team is the need for the developers to implement the smallest changes made by the designers as they experiment with different layouts. Each time the designers try out a new look in course of settling on an effective layout, the developers modify the application code, compile and link the code and then call on the designers to evaluate the result.

Apart from the need for countless meetings between designers and developers, the time taken in developing an application includes several cycles, termed "build," each build typically taking two to three days. At the end of a build the different component parts of an application are ready to be operated together (as opposed to being tested separately). Thus, desirable management of the application development process preferably reduces the tedium for the developers while leaving the designers unfettered and, at the same time, reducing costs and the time required for getting the application ready for shipping.

Another situation that results in the need for modifying primarily the user interface in an otherwise finished application is while porting the application from one linguistic and cultural context to another. This may result in changes in the size, associated text and appearance of the graphical controls to accommodate text, larger or smaller fonts, handedness, different designs and the like. Some parameters are relatively invariant within a particular context and can be provided as defaults. An application for a U.S. patent application Ser. No. 09/506,125 teaches providing sensible defaults and strategies for reducing coding complexity in implementing resource files to provide details in conformity with accepted, and/or desired, styles and is incorporated by reference.

SUMMARY OF THE INVENTION

In view of the foregoing, the present invention provides a method and system for developing software application programs that make resource files external to the other compiled files such that the information from the resource files may be obtained at runtime as needed without the need for compilation. Furthermore, the external resource file may be edited at runtime, and independent of the developers in general to allow designers to modify the look and feel for an application's interface without having to depend on developers to implement changes in the interface. This is enabled by the use of a markup language in the resource file to allow the resource file to be parsed on the fly at runtime. Routines are provided to locate the resource file and parse the markup language therein in response to a request for a resource. Such routines can be provided as part of the services offered by the operating system. In addition, scripts may be used to provide interactive interfaces. Furthermore, compartmentalization of the effort in developing and porting an application is facilitated for protection of source code and better management of designers and developers working on different aspects of a software application due to the externalization of the resource files needed primarily by the designers.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
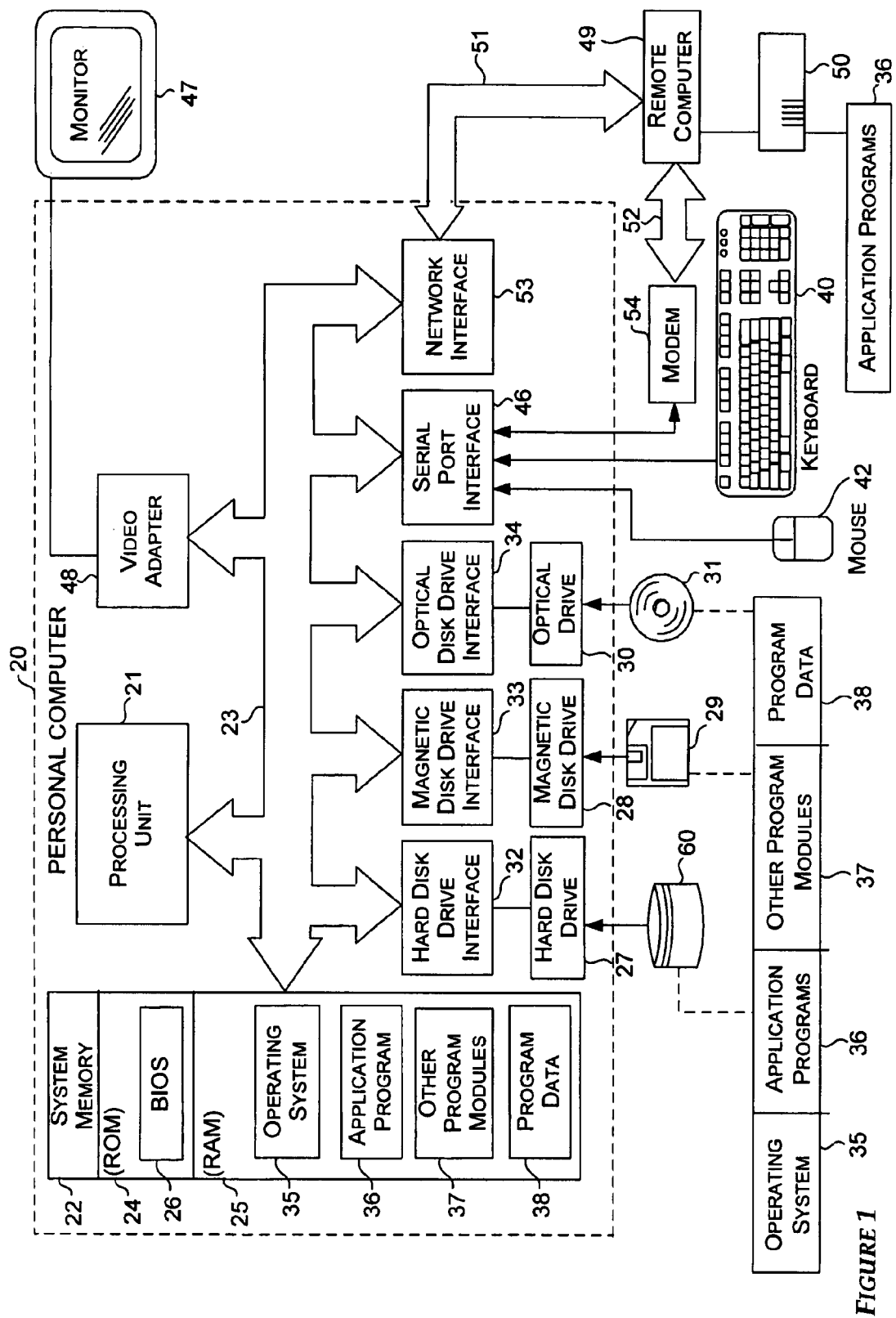
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. In particular, distributed computing based on dynamic networks that can reconfigure themselves with a device providing functionality, such as a video display, to another device is intended to be included.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In the context of resource files used by applications to implement user interfaces while executing in an exemplary computing environment, it is useful to consider some graphical controls. Table 1 presents a sampling of controls that are typically found in graphical interfaces. This list is not intended to be exhaustive, and instead, is only illustrative of the some of the behaviors made possible by different graphical elements. It is to be noted that additional graphical controls, including those with audio and video properties are being developed and being continually released. Thus, "graphical controls" and other similar terms should be understood to include audio/video capable elements. Graphical objects accept parameters for positioning the graphical object and generate events that may be handled by the application in course of interacting with a user. In addition, many operating environments may require the use of one or more Application Programming Interface (API) to properly invoke and manage the graphical controls. For instance, in the "WINDOWS®" operating system environment several APIs are available for setting up, modifying, communicating with and tearing down graphical controls. The skill required to implement such controls is a daunting task for many designers. Furthermore, the continual release of new controls both provides a rich environment for designers to develop interesting looking interfaces provided they can function without having to become skilled programmers.

TABLE 1

| Description | Options | Notifications |
|---|---|---|
| Status bar: displays information defined by an application. | Simple-mode - having only section; and Multi-mode - displaying more than one type of information in their respective sections. | May generate events corresponding to mouseovers or mouse clicks over a particular section. |
| Button: a bitmap displaying selected text. | Can associate text or selected bitmaps to modify its appearance. | May generate events corresponding to mouseovers or mouse clicks over a particular section. |
| Message box: displays a text message. | Can associate selected text. | May generate events corresponding to mouseovers or mouse clicks over a particular section. |

TABLE 1-continued

| Description | Options | Notifications |
| --- | --- | --- |
| Tool bar: displays a collection of buttons in a bar. | Can associate selected text or pictures. | May generate events corresponding to mouseovers or mouse clicks over a particular section. |
| Tool tip: displays text explaining the tool function. | Can associate selected text. | May generate events corresponding to mouseovers over a particular button or another graphic. |
| Trackbar: displays a scrolling control with a slider and a set of notches. | Can associate text and numbers with the scale. | May generate events corresponding to mouse-dragging events. |
| Spin box: displays arrows in an updown control. | Can specify location and size. | May generate events corresponding to mouse-clicks over a particular section. |

Figure 2:
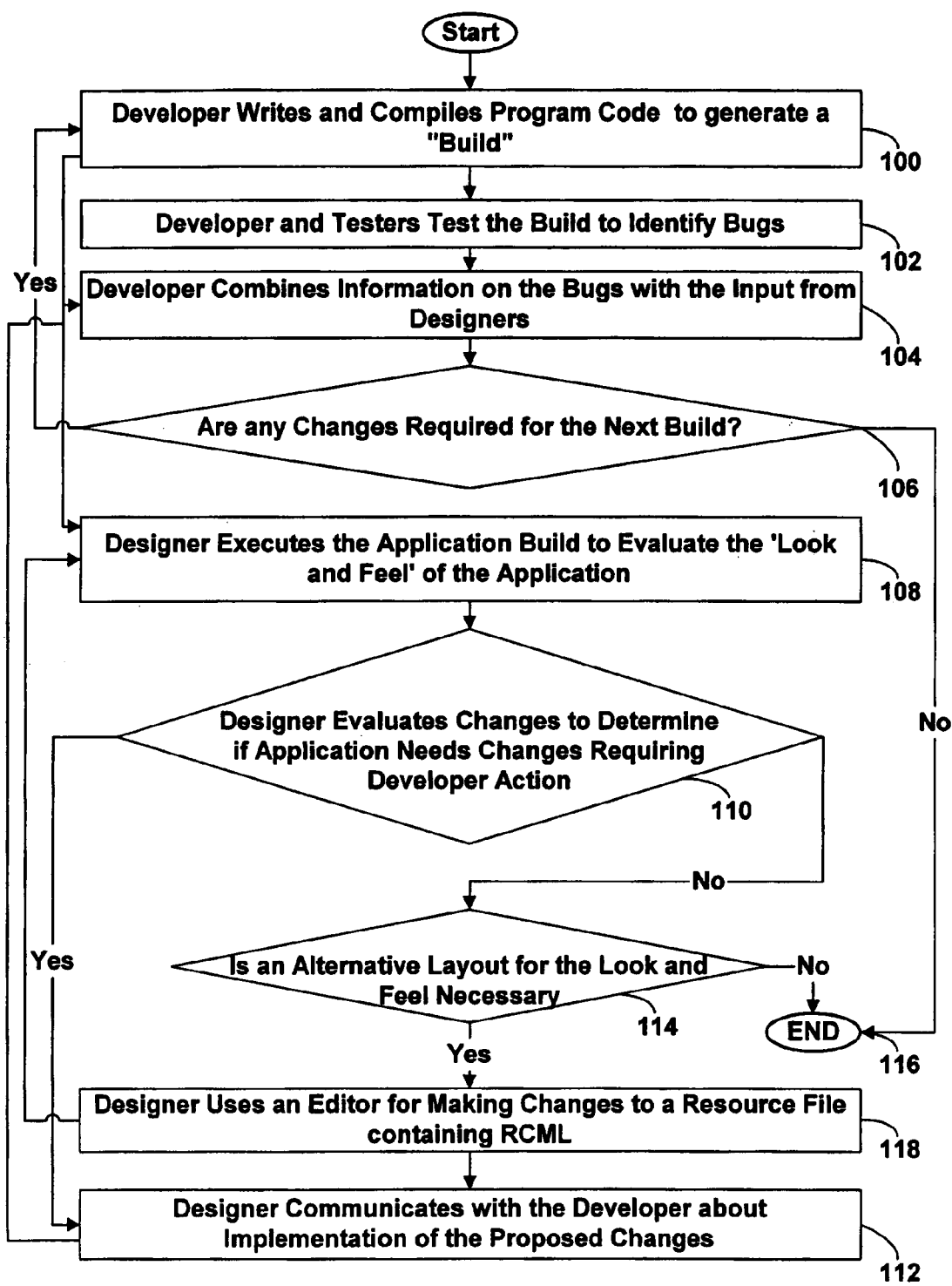
FIG. 2 is a schematic providing an overview of a typical application development process in a possible embodiment.

FIG. 2 is a flow diagram illustrating an application development environment comprising a designer and a developer. It should be noted that several designers and/or developers usually participate in a typical project. Thus the description here is not intended to be limiting as to the composition of suitable teams in a particular project. A Developer provides a build at step 100 in this embodiment. However, it should be understood that this need not always be the first step since it is possible to test a user interface using something less than a complete build. The application is executed (step 102) in order to assess the stability of the build and identify "bugs," which are flaws that are inevitably found in sophisticated application programs. Such sleuthing often requires sophisticated programming skills and serves to identify the next build, which aims to fix the defects. The knowledge about changes for fixing the bugs is combined with suggestions from the designer to determine the changes needed for generating the next build (step 104). Armed with the knowledge about bugs, whether derived from testing the build themselves, or obtained from others including beta testers and, of course the designer, the developer determines the changes to be made in the code (step 106), which results in another build and loops back to step 100.

The development of a build at step 100 also facilitates independent evaluation of the build by the designer (step 108) (and possibly other groups, such as User Ed and Usability, which are not shown), who evaluates the look and feel of the application to determine if the aesthetic impact and ease of use of the application is acceptable. The designer decides if the application requires changes that require developer action (step 110). Identification of such changes results in communicating with the developer (step 112) which, naturally leads back to a determination of changes needed for a new build (step 106) followed by a new build (step 100). Of course, it should be understood that the developer is typically not precluded from contributing to the aesthetic aspects and similarly every designer is not always prevented from contributing code.

On the other hand, if, at step 110, the designer decides that at least some changes do not require prior developer action, the possibility of a desirable alternative layout is determined (step 114). If no changes are required then the procedure ends (step 116), at least for this build. Else, the designer introduces the changes to implement the alternative layout, preferably with the help of a tool that removes the need to directly edit the markup language, in the resource file (step 118). A suitable tool may, e.g., provide a graphical environment for making the changes using drag and drop techniques. These changes can be evaluated on the same build for evaluating the aesthetic appearance of the application (step 108), thus completing an iteration by the designer in course of improving the application without requiring developer action. It should be noted that this description is intended to include the possibility that within a given build some changes may be handled by the developer while other changes are handled by the designer. If the desired changes only require developer action for implementation then the control would got to step 100 instead of step 108, as is the case in many application development environments. The overall effect is to reduce the development time since the designer does not need to wait for the developer to produce a build corresponding to most changes.

Furthermore, preferably, the designer should not have to concern himself or herself with the file naming conventions and the precise syntax required for the storing the data. These constraints are addressed in a preferred embodiment by using a markup language to store data in the resource data-containing file.

A markup language uses symbols to define commands or routines, usually, for locating and displaying information. Such symbols effectively divide textual information into text that is to be interpreted as a command, comment or data to be displayed. A popular overarching markup language specification is standard generalized markup language (SGML). While SGML does not provide a usable markup language itself, derivatives based on it are able to provide different functions by providing the necessary implementation details left open in SGML. A familiar markup language is the hypertext markup language (HTML) which is used for most web-based communications. Another rapidly maturing standard derived from SGML is the extensible markup language (XML), which is particularly suited for data exchange across the web. XML permits that use of schemas and document type definitions to prescribe the details for the implementation of a particular set of tags. It should be understood that although a preferred embodiment uses a particular XML based specification, termed resource markup language (RCML), alternative markup language specifications and strategies such as accessing information providing routines at runtime are intended to be included within the scope of the specification.

RCML includes a provision for using namespaces in order to provide a cross platform schema for specifying RCML. For instance, there are many different platforms with even more UI implementations. The basic RCML schema is defined by comparing various UI and designing RCML elements and attributes to fit the observed similarities. Furthermore, a specific namespace is used to access the specific improvements available in each platform. Thus, a "WIN32®" programmer can access the myriad of "WIN32®" style bits while a "WinCE™" or "WinTV™" programmer may write for a different style. This is illustrated below:

<CHECKBOX TEXT="Left Text R" ID="1010">
  <STYLE TEXT-ALIGN="RIGHT"/>
    <WIN32:CHECKBOX LEFTTEXT="YES"/>
  <WIN32: STYLE STATICEDGE="YES" TABSTOP="YES"/>
</CHECKBOX>

The code above may be compared to possible code written by other groups implementing checkboxes:

<CHECKBOX TEXT="Left Text R"ID-"1010">
  <STYLE TEXT-ALIGN="RIGHT"/>
    <NEPTUNE:STYLE HOTTRACK="YES"/>
    <WINCE: STYLE CLICKACCURACY="WIDE"/>
</CHECKBOX>

In addition, some functions may also be provided by the use of scripts for providing even further interactivity as is well known to one of ordinary skill in the art, including the use of scripts in the context of a markup language.

Figure 3:
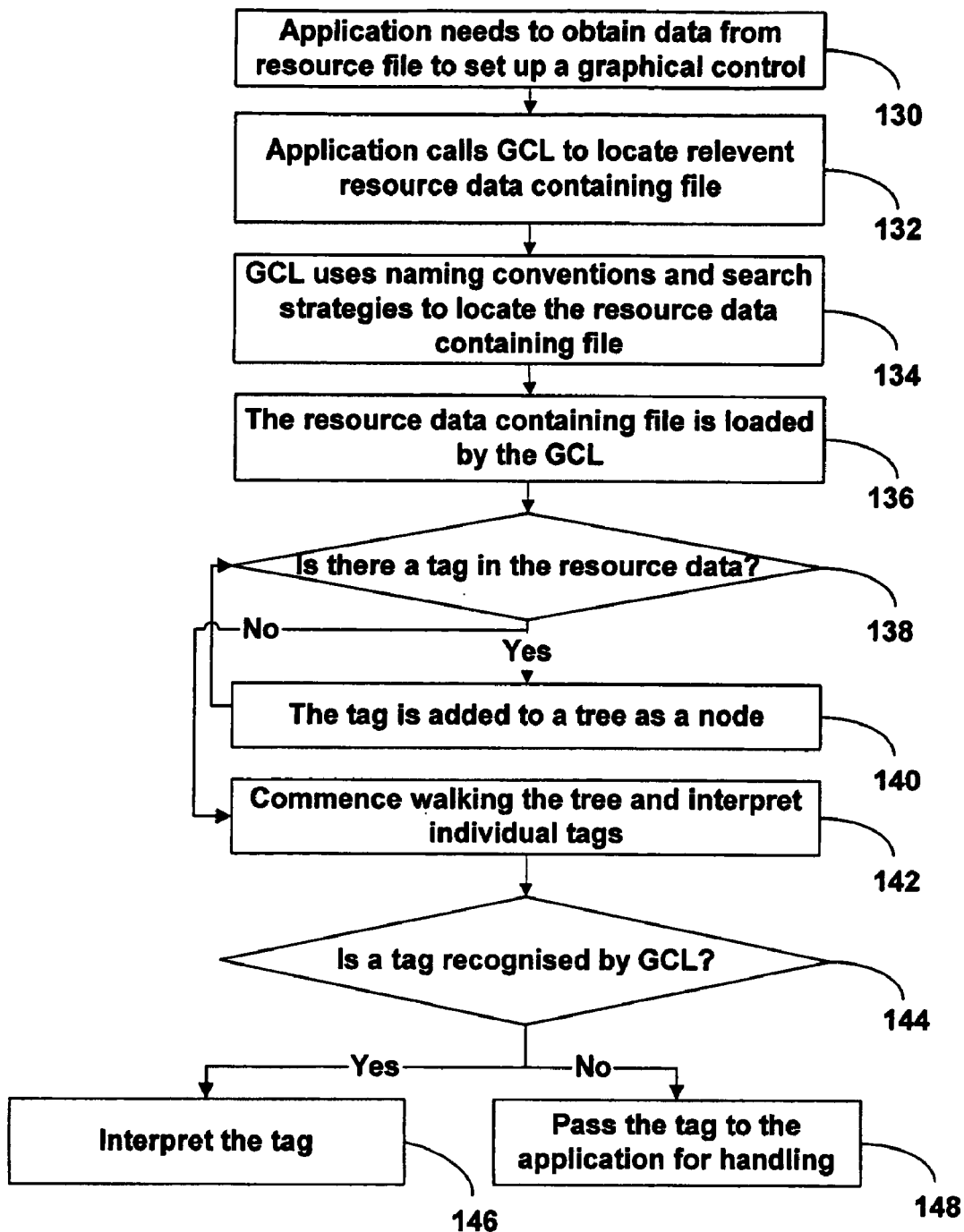
FIG. 3 is a schematic illustrating a high level overview of the development of an application.

FIG. 3 illustrates some broad concepts underlying many of the embodiments implemented in accordance with the invention. Broadly speaking an application requests that a particular graphical element be implemented (step 130). The operating system, following a sequence of one or more calls, provides a locating routine, termed here as a Graphical Control Locator (GCL), for locating a resource file containing the desired information (step 132) although similar routines from sources other than the operating system could be used as well. The GCL uses a defined strategy reflecting a file naming scheme and a systematic search of possible paths to locate the requested resource (step 134), which is loaded by GCL (step 136). In some embodiments, failure to locate the resource data may result in the application being asked to provide a coded version. An advantageous search strategy allows overriding the version of resources coded in the application code by external resource files by looking for application coded functionality only in the absence of external resource files. Thus, it provides easily modifiable resources without the risk of having an inoperative application due to unavailable resource data-containing files.

A tree is constructed next by parsing the text in the file to identify "tags" (step 138), followed by adding the tag to the tree as a node (step 140). Tags, in a markup language, are usually represented by text enclosed by "<" and ">" brackets. A tag initiates some behavior on the text following the tag. A closing tag, distinguished by the additional presence of the "/" symbol is required to mark the other end of the text to be operated upon. For instance "<HTML>" is a tag identifying a particular markup language. "</HTML>" is the corresponding closing tag, the use of which is required in XML based markup languages.

Following the construction of the tree, it is "walked" (step 142). In course of walking the tree, the tree is traversed and the actions prescribed by the nodes carried out. In an embodiment, if a particular tag is recognized by GCL (step 144) to identify desired parameters then it is supplied to a routine for implementing an appropriate graphical control (step 146) along with required contextual identifiers or handles. Else the tag information may be ignored, or preferably, communicated to the application (step 148), or some other prescribed routine.

Thus, the resource data file may include tags that are not specified in the schema but may be handled by the application or even handled in only some of the implementations. The loader, in some implementations, can be made pluggable so that additional namespaces may be added to the RCML schema to accommodate additional platforms or computing environments. Preferably, the resource data-containing file is closed when the stored parameters stored therein are no longer needed. It should be noted that in some embodiments there may be several resource data-containing files in a single application while in other embodiments a single resource data-containing file may be used with the application preferably requesting data corresponding to a particular node, i.e., graphical control.

In a preferred embodiment, the GCL, application and the graphical control rendering routines communicate using defined messaging systems. For instance, in a "WINDOWS®" environment, the GCL is a resource loader provided by the operating system. The application calls the resource loader to locate a resource file, which is located by using the name of the application since external resource files are labeled with a resource identifier appended to the end of the application name, e.g., "APPLICATION-101.RCML." Alternatively, the identifier is used to retrieve a particular resource from a resource file. The resource loader uses the standard strategy of searching the directory where the application resides before searching alternative locations. If it fails to locate the resource file then the code available in the application is used in response to a message sent to the application. The resource loader parses the resource file in accordance with a schema specified for RCML, although other embodiments may use a document-type-definition or other strategies well known to one of ordinary skill in the art.

Since the logically many of the graphical controls are "WINDOWS®" elements owned by other "WINDOWS®" elements, the call to the resource loader may include a parent or owning "WINDOWS®" element's handle along with a handle for the invoking application instance. The data in the resource file, read in accordance with the parameter specifications, is sent to the relevant child "WINDOWS®" element using the messaging service API provided by the operating system. In effect all communication between the different components is managed by standard operating system components with the notable exception of the resource loader, which is an additional component provided by the operating system. This implementation allows systematic invocation of the child "WINDOWS®" elements, which may continue to exist with their own handles allocated by the operating system, at least in some implementations, even if the parent "WINDOWS®" element is closed. Some of these "WINDOWS®" elements may generate events in response to user actions that would again result in the messaging system being invoked to produce the desired response. Such events may be handled at the level of the child "WINDOWS®" element or by the resource loader itself. Other events may trigger the parent "WINDOWS®" element or even the application.

Figure 4:
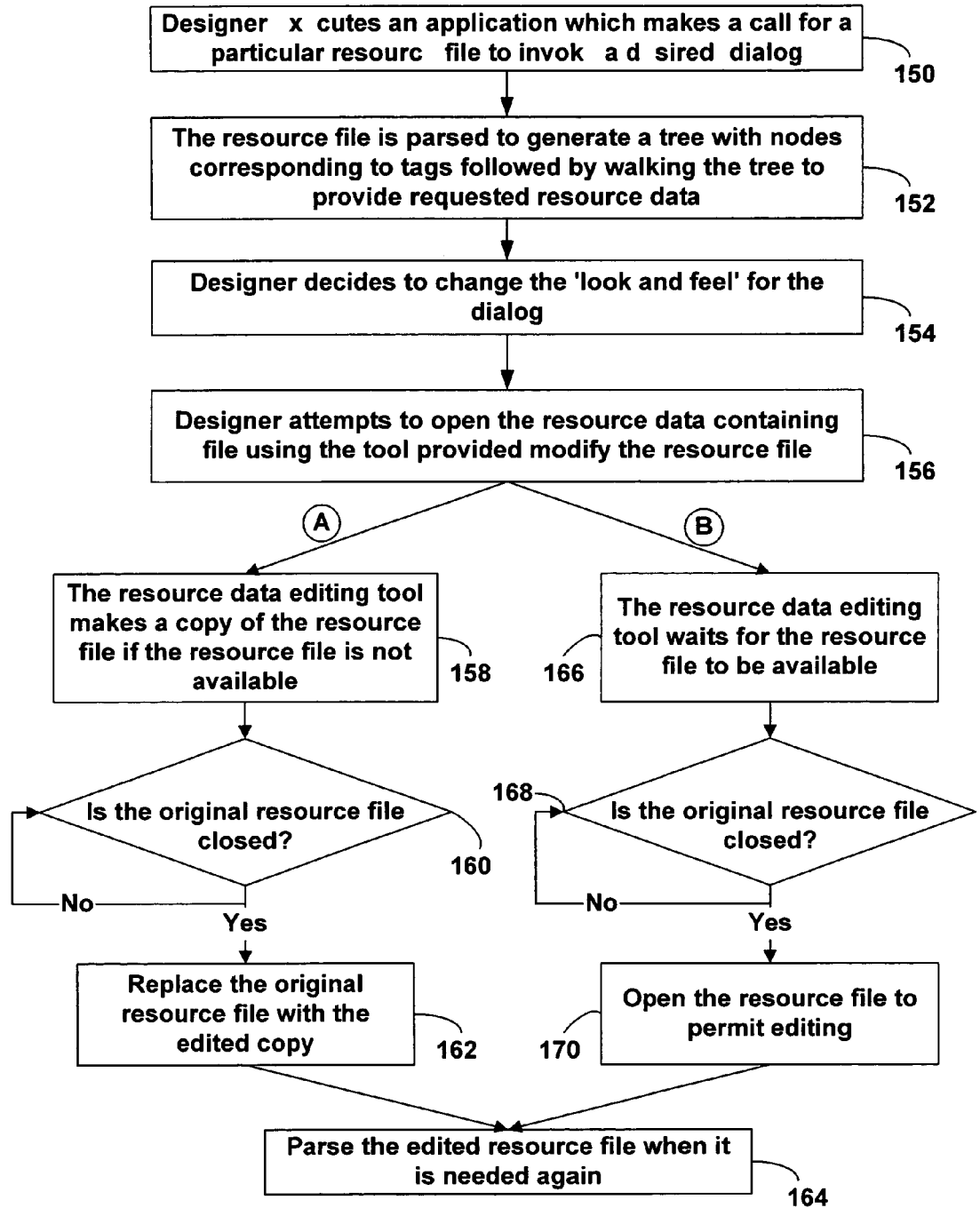
FIG. 4 shows an embodiment where a user edits a resource file while an application is executing.

FIG. 4 illustrates an embodiment where a user can edit a resource file preferably using a tool such as a resource data editor while the corresponding application is executing. The use of a markup language allows editing of the resource data since parsing the text again can be used to implement the resulting changes. Preferably, the resource data-containing file is closed prior to opening it for editing, although a copy of the file may be made for facilitating editing and invoked after the earlier version is closed along with replacement of the earlier version by the edited version. Additional variations including providing options for saving different versions of a resource file can be advantageously provided in other embodiments in accordance with the invention.

This flexible handling of the resource data results in the designer being able to modify the appearance of the application while it is executing since the markup language in the resource file is preferably parsed afresh when needed again. Typically, in some embodiments of the invention, a designer receives a build of an application and proceeds to tweak its 'look and feel' by first executing the application (step 150). When the application needs to invoke a dialog control, the resource data-containing file is accessed, parsed and walked in course of providing data to the dialog control element (step 152). Examination of the appearance of the dialog control persuades the designer to experiment with another look (step 154). The designer attempts to edit the resource data using the tool provided for the purpose (step 156). The tool attempts to open the resource file and may provide different behaviors in various embodiments, some of which are described next.

In an embodiment A, the editing tool makes a copy of the resource file to allow the designer to proceed with editing (step 158). Following editing the tool waits for the original resource file in use to be closed (step 160). If the original resource containing data file has been closed, it is replaced by the edited resource file (step 162) and it is this new resource data file that is parsed and walked if the application again requests the resource (step 164).

In an exemplary embodiment B, the resource editor may choose to wait until the resource data-containing file is closed (step 166) by checking the status to the resource file of interest (step 168). When the resource file becomes available, it is edited (step 170) and invoked at the next request for the resource data, which results in this modified file being parsed and walked (step 164). This description is not intended to exclude embodiments that utilize different strategies to address the need to edit resource data without terminating the application. Such strategies include, e.g., an error returned upon attempting to access a resource data-containing file in use, possibly with a message posted if the editable resource data is available. Or the resource data editing tool may be grayed out while the resource file is unavailable, or a second copy of the resource file parsed and walked without waiting for a second request for the resource data from the application and the like.

In many application development scenarios the basic application is ready, but the graphical controls may be less than appealing in a particular context. This may happen, e.g., in porting an application from one language to another or even to another cultural context while keeping the language the same. In such a situation, naturally, the lion's share of the work is expected to be design work. However allowing unfettered access to the source code to the designers can have serious undesirable consequences. The debugged code may be accidentally corrupted. Even more significantly, applications are shipped in a compiled executable form that makes it difficult to reconstruct the original source code. In many jurisdictions the rules governing trade secrets, copyrights and patents do not provide sufficient protection against theft of the source code. Thus, compartmentalization of access to the valuable source code from design features is desirable to permit targeting of markets where the risk of code piracy may otherwise result in unacceptable consequences.

Figure 5:
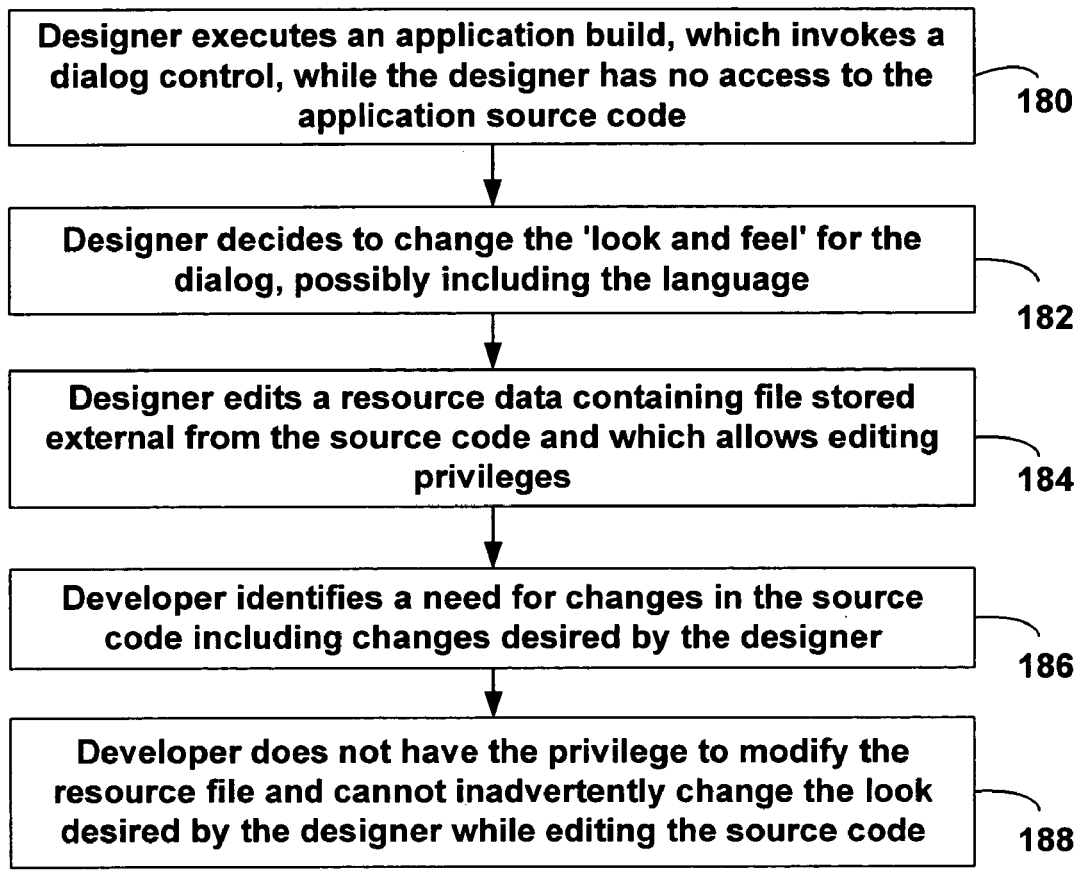
FIG. 5 illustrates an embodiment where access to resource files and rest of the code is limited in order to guard against, intentional or unintentional damage to the software or pirating of the source code.

In an embodiment of the invention, illustrated in FIG. 5, the designer privileges are restricted to executing a build of the application and access to the editing tools and the resource data-containing files. This organization of the development environment enables protection of the source code against inadvertent or malicious damage while making the task of the designer easier, thus reducing costs in porting the application to different linguistic and cultural contexts. Furthermore, such compartmentalization can also be used to prevent the developers from second guessing the changes made by the designers, thus, further streamlining the process of application development.

Thus, the designer executes an application without having access to the source code (step 180). Such limited access can be implemented by requiring a password for accessing a relevant file, directory, or persistent memory. If the designer decides to change the look and feel of the application (step 182), he/she edits a resource file on which editing privileges are available and which is stored external to the application (step 184). On the other hand, in some embodiments it is possible to restrict a developer's access to the resource file(s) as well. If a developer decides to change the code for the application (step 186), which he/she is naturally permitted to modify, he/she may be denied privilege to access or modify the resource file itself (step 188).

In yet another embodiment, the packaged application is shipped with an external resource data-containing file that may be edited with the help of a resource data-editing tool by a user. This is in contrast to the usual practice of shipping an application complete with the user interface in one integrated package, i.e., using the external resource files primarily in developing or porting an application but releasing a compiled version of the product. Providing an external resource data-containing file allows a user to modify the user interface to suit personal preferences.

It should also be noted that alternative division of labor strategies (as opposed to the division between designers and developers) can be used advantageously with the use of external resource files. An example would be identifying text evaluating personnel, e.g., in course of translating to another language, from graphical artists who may provide copyrighted art including multimedia, i.e., audio and video, to an application's interface. Typical application development teams include software design engineering, functional specification design, visual (possibly multimedia), interface design, prototyping, usability testing, marketing and writing handling personnel. Such a division may be preferable for reasons of efficiency, management ease, security or protecting intellectual property.

Figure 6A:
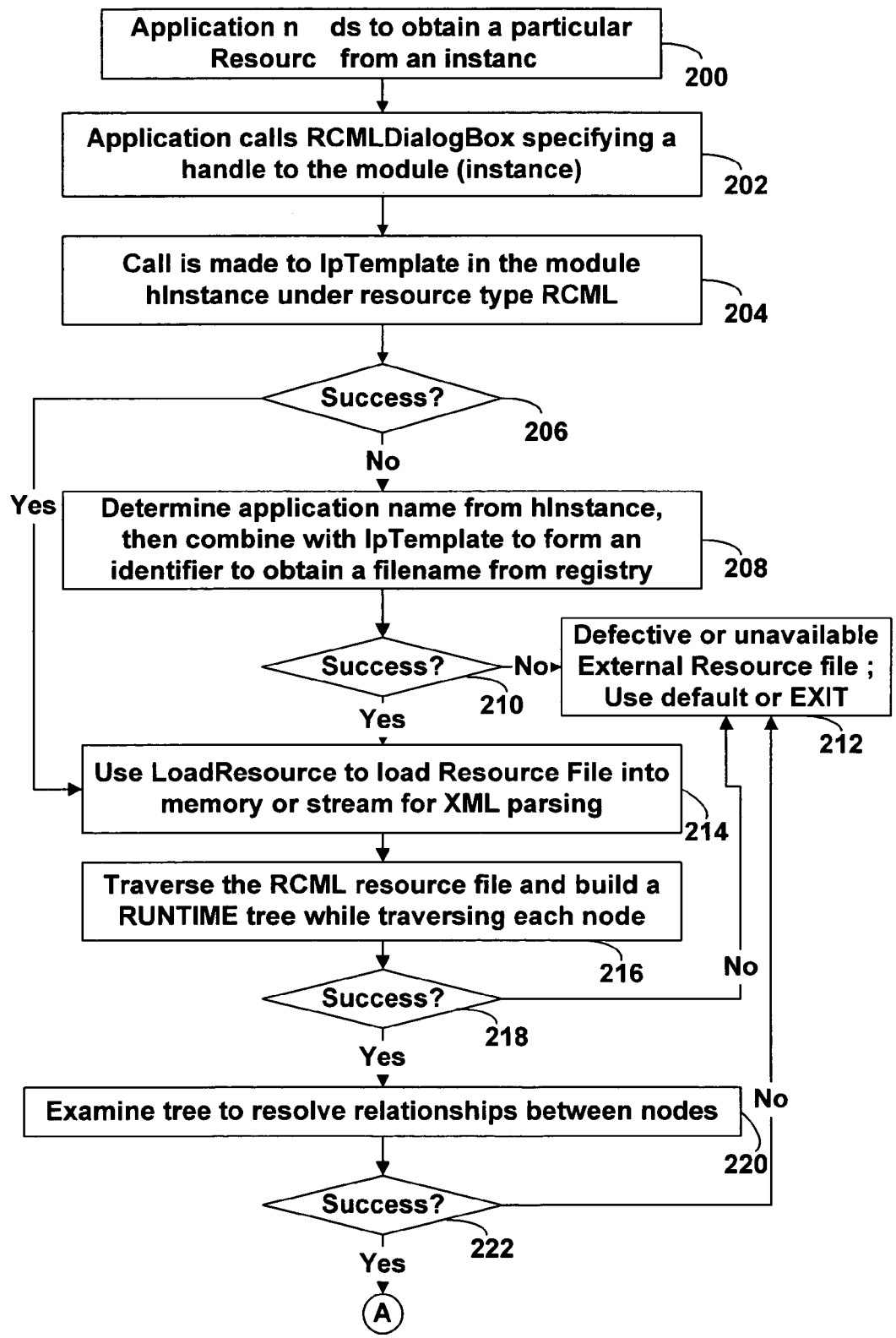
FIGS. 6A and 6B illustrate an embodiment in the "WINDOWS®" operating system environment.
Figure 6B:
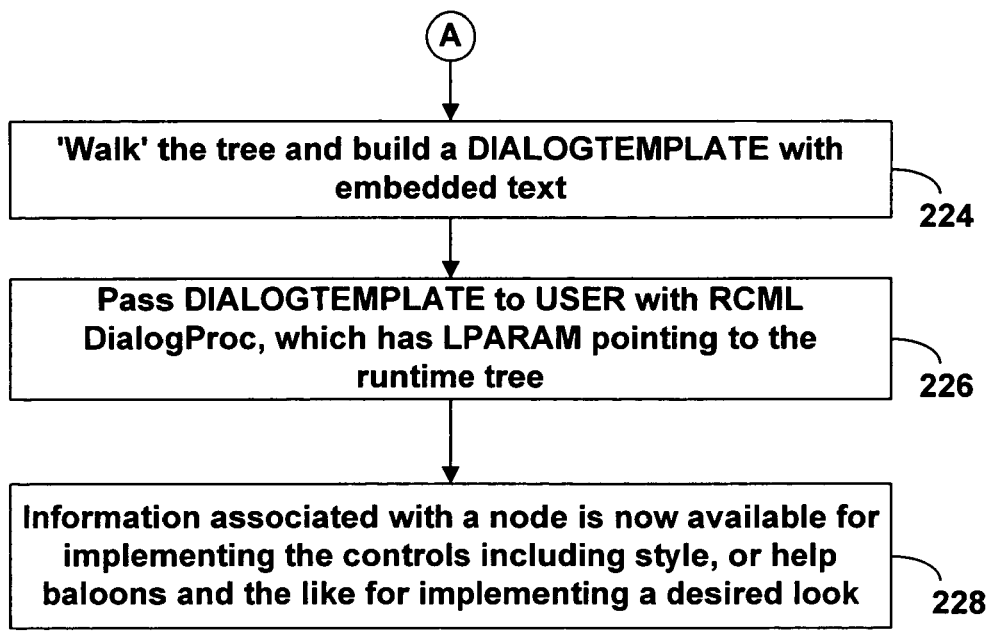

FIGS. 6A and 6B provide a detailed description of an embodiment in the "WINDOWS®" operating system environment. This description is not intended to exclude other operating systems such as the "MACINTOSH®," "SOLARIS®" and other UNIX based platforms along with distributed computing.

A convenient starting point is the identification of a need for a resource by an application (step 200). The application calls the operating system, termed USER, and eventually a call is made to RCMLDialogBox with a handle to the instance of the application making the original request (step 202). This is followed by a call being made to the IpTemplate in the module hInstance looking for the resource type RCML (step 204). If the call does not succeed (step 206) then the application name is determined from hInstance and combined with IpTemplate to form an identifier followed by searching the registry for the application name (step 208). Success in obtaining the application name is evaluated at step 210. The inability to obtain an application name means that an external resource file is not available (step 212) and an error or exit message is generated. However, success in obtaining the name of the application (step 210) or the resource file (step 206) leads to loading the resource file in memory (step 214).

The resource file is traversed and parsed in accordance with the XML handling procedures to build a runtime tree (step 216). Each node in the runtime tree represents an element and provides access to its children and attributes. If the parsing step fails, an error in the markup language is indicated and again the program exits (step 218). Successful tree construction leads to an examination of the relationships between the node in the tree (step 222). Detection of errors results in termination of further processing (step 222).

Success at step 222 leads to FIG. 6B. The tree is "walked," which is a term of art, and each node is used to build a DIALOGTEMPLATE. Extraneous text and attributes are embedded to permit processing beyond that foreseen by the RCML schema and the loader (step 224). This DIALOGTEMPLATE is passed to the USER with RCML DialogProc with LPARAM pointing to the runtime tree (step 226). The operating system calls DialogProc back and the DialogProc handles the messages WM_INITIAL-DIALOG, where "WM" signifies a message from the operating system. As may be expected, messages from particular dialog boxes to the operating system, and eventually to the application, have their own prefixes. Now the initial DialogBox is set up and the associated information is available to implementing the control (step 228) with the use of standard messaging. Editing the RCML text results in another cycle of parsing the text and related steps without requiring compilation. Such editing can be advantageously be performed by well known user friendly markup language editors modified to implement the context of RCML. Most individuals are comfortable with graphic or text editing as opposed to demands placed by coding. Thus, it is easier to modify the resource files in a markup language than to code for resources.

In addition, in some embodiments a resource file, similar to a RCML based resource file described in many of the embodiments in this application, may be dynamically generated in part or entirely, at runtime. Such a resource file, or a suitable image thereof, may be made available to a designer at runtime for implementing changes in accordance with the invention.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer software application development system comprising:
    a first group of system users responsible for modifying one or more external resource files written in a markup language, at least one of the external resource files comprising at least one extensible markup language tag associated with at least one of a plurality of platform namespaces;
    a second group of system users responsible for writing computer software code;
    a graphical control locator for locating the one or more external resource files;
    a parser for identifying a requested parameter stored in the one or more external resource files; and
    a runtime tree built from the one or more external resource files in response to a resource request that references at least one of a plurality of graphical controls;
    wherein at least some of the plurality of graphical controls have a parent-child relationship with others of the plurality of graphical controls; and
    wherein a reference to the runtime tree is sent to each graphical control in a parent-child relationship with the at least one of the plurality of graphical controls referenced by the resource request.

2. The system of claim 1 wherein at least one system user in the first group of system users cannot access the computer software code directly without authorization.

3. The system of claim 1 wherein at least one system user in the second group of system users cannot access the one or more external resource files without authorization.

4. The system of claim 1 wherein the one or more external resource files are generated dynamically.

5. The system of claim 1, wherein different ones of at least some of the plurality of platform namespaces correspond to different computing platforms.

6. The system of claim 1, wherein different ones of at least some of the plurality of platform namespaces correspond to different computing platform versions.

7. The system of claim 1, wherein different ones of at least some of the plurality of platform namespaces correspond to different graphical user interface (GUI) implementations.

8. The system of claim 1, wherein the system comprises a plurality of graphical control locators and each graphical control locator corresponds to at least one of the plurality of platform namespaces.

9. The system of claim 8, wherein each graphical control locator corresponds to different ones of the plurality of platform namespaces.

10. The system of claim 1, wherein at least one of the external resource files comprises a plurality of extensible markup langauge tags, the plurality of extensible markup langauge tags comprising:
    at least one extensible markup langauge tag recognized by the graphical control locator; and
    at least one extensible markup langauge tag not recognized by the graphical control locator.

11. The system of claim 10, wherein:
    the system further comprises an application, the application comprising at least one graphical control; and
    at least some of the information contained in the at least one extensible markup language tag recognized by the graphical control locator is supplied to at least one of the at least one graphical control.

12. The system of claim 11, wherein the information contained in each of the at least one extensible markup language tag not recognized by the graphical control locator is supplied to the application.

13. The system of claim 1, wherein the graphical control locator is a component of a computer operating system.

14. A method for enhancing security in a computer software application development environment, the method comprising:
   creating one or more external resource files for storing data in a markup language for implementing resources, at least one of the external resource files comprising at least one extensible markup language tag associated with at least one of a plurality of platform namespaces;
   using a graphical control locator for retrieving information from the one or more resource files in response to a request for a resource;
   providing a first user with authority to modify the one or more resource files and execute an application program associated with the one or more resource files;
   restricting the first user from accessing and modifying source code for the application program; and
   building a runtime tree from the one or more external resource files in response to a resource request that references at least one of a plurality of graphical controls;
   wherein at least some of the plurality of graphical controls have a parent-child relationship with others of the plurality of graphical controls; and
   wherein a reference to the runtime tree is sent to each graphical control in a parent-child relationship with the at least one of the plurality of graphical controls referenced by the resource request.

15. The method of claim 14 wherein the method further includes restricting a second user from accessing and modifying the one or more resource files.

16. The method of claim 15 wherein restricting the second user comprises restricting a developer from accessing and modifying the one or more resource files.

17. The method of claim 15 wherein restricting the second user comprises restricting a text evaluator from accessing and modifying the one or more resource files.

18. The method of claim 14 wherein the first user is a user interface designer.

19. The method of claim 14 wherein restricting the first user comprises using a password to determine whether the first user should be allowed access to the source code.

20. The method of claim 14 wherein restricting the first user comprises using a key to determine whether the first user should be allowed access to the source code.

21. The method of claim 14 wherein the one or more external resource files are generated dynamically.

22. A computer-readable medium having computer executable instructions for carrying out a method for enhancing security in a computer software application development environment, the method comprising:
   creating one or more external resource files for storing data in a markup language for implementing resources, at least one of the external resource files comprising at least one extensible markup language tag associated with at least one of a plurality of platform namespaces;
   using a graphical control locator for retrieving information from the one or more resource files in response to a request for a resource;
   providing a first user with authority to modify the one or more resource files and execute an application program associated with the one or more resource files;
   restricting the first user from accessing and modifying source code for the application program; and
   building a runtime tree from the one or more external resource files in response to a resource request that references at least one of a plurality of graphical controls;
   wherein at least some of the plurality of graphical controls have a parent-child relationship with others of the plurality of graphical controls; and
   wherein a reference to the runtime tree is sent to each graphical control in a parent-child relationship with the at least one of the plurality of graphical controls referenced by the resource request.

23. The computer-readable medium of claim 22 wherein the method further comprises restricting a second user from accessing and modifying the one or more resource files.

24. The computer-readable medium of claim 23 wherein restricting the second user comprises restricting a developer from accessing and modifying the one or more resource files.

25. The computer-readable medium of claim 23 wherein restricting the second user comprises restricting a text evaluator from accessing and modifying the one or more resource files.

26. The computer-readable medium of claim 22 wherein the first user is a user interface designer.

27. The computer-readable medium of claim 22 wherein restricting the first user from accessing and modifying the source code comprises using a password to determine whether the first user should be allowed access to the source code.

28. The computer-readable medium of claim 22 wherein restricting the first user from accessing and modifying the source code comprises using a key to determine whether the first user should be allowed access to the source code.

29. The computer-readable medium of claim 22 wherein the one or more external resource files are generated dynamically.

* * * * *